United States Patent
Hou et al.

(10) Patent No.: US 11,912,932 B1
(45) Date of Patent: Feb. 27, 2024

(54) ENCAPSULATED POLYMER FLOODING METHOD AND SYSTEM FOR ENHANCING OIL RECOVERY

(71) Applicant: CHINA UNIVERSITY OF PETROLEUM (EAST CHINA), Qingdao (CN)

(72) Inventors: Jian Hou, Qingdao (CN); Bei Wei, Qingdao (CN); Yongsheng Liu, Qingdao (CN); Kang Zhou, Qingdao (CN); Qingjun Du, Qingdao (CN); Yongge Liu, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 18/338,816

(22) Filed: Jun. 21, 2023

(30) Foreign Application Priority Data

Feb. 27, 2023 (CN) .......................... 202310166917.8

(51) Int. Cl.
   *E21B 43/34* (2006.01)
   *C09K 8/588* (2006.01)
   *C09K 8/92* (2006.01)

(52) U.S. Cl.
   CPC .............. *C09K 8/588* (2013.01); *C09K 8/92* (2013.01)

(58) Field of Classification Search
   CPC ............ C09K 8/588; C09K 8/92; E21B 43/34
   USPC ....................................... 166/305.1
   See application file for complete search history.

(56) References Cited

U.S. PATENT DOCUMENTS

| 2008/0283247 A1* | 11/2008 | Zubrin | E21B 43/168 166/305.1 |
| 2009/0008089 A1* | 1/2009 | Zubrin | E21B 43/168 166/250.15 |
| 2010/0300682 A1* | 12/2010 | Thakur | E21B 43/00 166/250.01 |
| 2016/0272882 A1* | 9/2016 | Stray | C09K 8/92 |

* cited by examiner

*Primary Examiner* — Zakiya W Bates
*Assistant Examiner* — Ashish K Varma
(74) *Attorney, Agent, or Firm* — CBM PATENT CONSULTING, LLC (57) ABSTRACT

An encapsulated polymer flooding method and system for enhancing oil recovery includes: (1) determining reservoir parameters, a well deployment, and a development dynamic state of a target oil reservoir; (2) determining a near-wellbore targeted profile control area and a far-wellbore targeted viscosification area; (3) designing and synthesizing an encapsulated polymer according to conditions of the target oil reservoir; (4) evaluating and determining whether the anti-shearing performance, the sustained release and viscosification performance, the injection performance, and the profile control performance of the encapsulated polymer meet expected performance requirements based on laboratory tests; (5) formulating an injection scheme for an encapsulated polymer flooding field; and (6) monitoring the development dynamic state of the oil reservoir; according to the present disclosure, the polymer is wrapped with a shell layer, which greatly reduces the shear degradation during injection of the polymer and effectively reduces the cost.

7 Claims, 4 Drawing Sheets

ENCAPSULATED POLYMER FLOODING METHOD AND SYSTEM FOR ENHANCING OIL RECOVERY

CROSS-REFERENCE TO RELATED APPLICATIONS

This application claims priority to Chinese Patent Application Ser. No. CN2023101669178 filed on 27 Feb. 2023.

FIELD OF THE INVENTION

The present disclosure belongs to the technical field of oil and gas field development, and specifically, relates to an encapsulated polymer flooding method and system for enhancing oil recovery.

BACKGROUND OF THE INVENTION

Polymer flooding or polymer-based chemical flooding (such as multi-component compound flooding and heterogeneous compound flooding), as an important method for enhancing oil recovery, has been industrially popularized and applied on a large scale in high water-cut oilfields (such as Daqing and Shengli Oilfields) in eastern China, involving about 1.5 billion tons of geological reserves and achieving an average recovery rate of 50%. Meanwhile, it has also been widely used in the world. Even so, due to a high shear rate and serious reservoir heterogeneity in a vicinity of an injection well, conventional polymer flooding still has the problems of large shear loss, serious low-efficiency circulation, and the like, which affect the development effect and economic benefits of polymer flooding. Therefore, it is necessary to explore a novel chemical flooding method to enhance oil recovery.

Based on the above analysis, conventional polymer flooding faces two major problems: one is that wellbore and near-wellbore shear degradation losses are large, and a viscosity loss rate during injection allocation of a conventional polymer may reach 50-70%; and the other one is that even if a polymer has a profile control effect, an injected chemical agent fluid will be channeled from an extremely high-permeability layer, resulting in serious low-efficiency circulation.

SUMMARY OF THE INVENTION

In view of the deficiencies, such as the large near-wellbore shear degradation loss, difficulty in deep profile control, and generally low oil recovery rate, of the conventional polymer flooding in the prior art, the present disclosure proposes an encapsulated polymer flooding method for enhancing oil recovery, which is based on the idea of learning from a structure of a medical enteric-coated capsule and synthesizing a latex system of containing polymer capsules on the ground. A capsule wraps a polymer to bind a molecular chain as if the molecular chain wears a "straitjacket", the viscosity is not released, and the shear resistance is strong. Moreover, the capsule is a particle, which can temporarily block, deform, and migrate in the rock to achieve a strong near-wellbore profile control and displacement effect, and reduce the low-efficiency circulation of an injected fluid. When the polymer capsule migrates to a deep part of a reservoir, a shell layer of the capsule is gradually broken under the action of formation conditions (temperature, salinity, and the like) and releases the internal encapsulated polymer, the molecular chain of the polymer is stretched to realize sustained release and viscosification of the displacing fluid. The method can effectively improve the flooding effect of the polymer, and further release the polymer to enhance oil recovery.

The method is suitable for water flooding oil reservoirs, polymer-based chemical flooding oil reservoirs, especially medium- and low-permeability oil reservoirs in onshore oilfields, and chemical flooding oil reservoirs in offshore oilfields.

Related terms will be explained below:
1. longitudinal permeability: permeability along a depth direction of a reservoir;
2. longitudinal average remaining oil saturation: saturation distribution along a depth direction of a reservoir;
3. variation coefficient: a ratio of a standard deviation of original data to a mean of the original data, reflecting a dispersion degree of the data;
4. electrostatic shielding mechanism of salinity: a capsule shell, that is, molecules of a shell layer, have electrostatic interactions, and salt ions can destroy the shell layer and shield the electrostatic interactions, making the structure of the shell layer unstable, shrink, and deform;
5. water percolation and swelling mechanism: after a shell layer is destroyed, water enters a capsule, and a polymer in the capsule swells when contacting with water;
6. temperature dissolution mechanism: an outer shell of a capsule is dissolved at high temperature;
7. shear test: a capsule is sheared at a certain rate, and whether the capsule is destroyed is observed;
8. laboratory aging test: a solution is placed at a certain temperature under a certain salinity, and other conditions, and sustained release of the solution is observed;
9. single core encapsulated polymer injection test: a core displacement test, in which an encapsulated polymer is injected, and an inlet pressure change is observed; and
10. double-pipe permeability ratio seepage test: a parallel core displacement test, in which one core is a high-permeability core and the other core is a low-permeability core, and outflows of the two pipes are observed.

The present disclosure adopts the following technical solution:

An encapsulated polymer flooding method for enhancing oil recovery includes:
(1) determination of reservoir parameters, a well deployment, and a development dynamic state of a target oil reservoir determining reservoir permeability, porosity, heterogeneity, temperature, salinity, positions of and a relative distance between a water injection well and a producing well, and a remaining oil distribution;
(2) determination of a near-wellbore targeted profile control area and a far-wellbore targeted viscosification area determining an area with the maximum intra-reservoir longitudinal permeability ratio or a longitudinal permeability variation coefficient greater than 0.6 in a seepage direction as a near-wellbore targeted profile control area of the oil reservoir, defining the maximum horizontal distance between the near-wellbore targeted profile control area of the oil reservoir and the water injection well as a targeted distance $x_1$, determining an area with the intra-reservoir longitudinal average remaining oil saturation greater than 0.6 as a far-wellbore targeted viscosification area, and defining the minimum horizontal distance between the far-wellbore targeted viscosification area and the water injection well as a targeted distance $x_2$;

(3) design and synthesis of an encapsulated polymer according to the conditions of the target oil reservoir
an encapsulated polymer refers to a microencapsulated polymer formed by wrapping a polymer with a shell layer by a chemical encapsulation method,
customizing a particle size and an elastic modulus of an encapsulated polymer according to near-wellbore permeability conditions; and
customizing a trigger mechanism of the encapsulated polymer according to the targeted distances and the conditions of the reservoir, the trigger mechanism of the encapsulated polymer including an electrostatic shielding mechanism of salinity, a water percolation and swelling mechanism, and a temperature dissolution mechanism;
(4) evaluating and determining whether the anti-shearing performance, the sustained release and viscosification performance, the injection performance, and the profile control performance of the encapsulated polymer meet expected performance requirements based on laboratory tests; and performing step (3) to redesign an encapsulated polymer if no;
(5) formulating an injection scheme for an encapsulated polymer flooding field; and
(6) monitoring the development dynamic state of the oil reservoir, and iteratively regularly optimizing the properties of the encapsulated polymer and the injection scheme for the flooding field according to steps (1) to (5).

According to the present disclosure, preferably, a criterion for determining the particle size is represented by formula (I):

$$d = a\tau\sqrt{\frac{8k}{\phi}} \quad (I)$$

in formula (I), d is the particle size of the encapsulated polymer, a is a coefficient with a value range of 0.1-5, $\tau$ is tortuosity of the near-wellbore targeted profile control area, k is average permeability of the near-wellbore targeted profile control area, and $\phi$ is porosity of the near-wellbore targeted profile control area.

According to the present disclosure, preferably, a criterion for determining the elastic modulus is represented by formula (II):

$$E = (0.1 + bk_{mn})E_0 \quad (II)$$

in formula (II), E is the elastic modulus of the outer shell of the capsule, b is a coefficient with a value range of 0.01-5, $k_{mn}$ is an intra-reservoir permeability ratio, $E_0$ is a reference elastic modulus taking $$E_0 = \sigma_0\sqrt{\frac{\phi}{8000\tau^2 k}},$$

and $\sigma_0$ is reference interfacial tension.

According to the present disclosure, preferably, in step (4),
an anti-shearing test is performed on capsules at different mass concentrations to determine a critical shear rate at which the capsule is broken at ground temperature, that is, the anti-shearing performance of the encapsulated polymer;

a laboratory aging test is performed to determine a release rate and the viscosification performance of the polymer in the formation, that is, the sustained release and viscosification performance, a relationship between the viscosity of the polymer and time satisfies $\mu = \alpha t^n \mu_{max}$, $\mu$ is the viscosity, $\mu_{max}$ is the maximum viscosity of the polymer capsule after complete release, t is time, and a and n are coefficients;

a single core encapsulated polymer injection test is performed, and a pressure change during injection, that is, the injection performance, is recorded;

a double-pipe permeability ratio seepage test is performed, a profile improvement coefficient is recorded to evaluate the profile control performance, and the optimal profile control concentration is denoted as $c_1$; and the expected performance requirements are that: the critical shear rate of the encapsulated polymer is not less than 600 s$^{-1}$, the maximum viscosity of the polymer capsule after complete release is not less than 20 mPa·s, pressure during injection of the encapsulated polymer is less than 5 times of pressure during injection of water, and the profile improvement coefficient is greater than 50%.

According to the present disclosure, preferably, in step (5), the injection scheme for the encapsulated polymer flooding field includes:

first, injecting an encapsulated polymer 0.1PV at a concentration of $c_1$ at an injection rate $Q_1$ satisfying $$\alpha\left(\frac{A\phi x_1}{2Q_1}\right)^n < 0.3,$$

A being the cross-sectional area of the formation, and $\phi$ being the porosity of the near-wellbore targeted profile control area;

then, injecting an encapsulated polymer 0.4PV at a concentration of $0.5c_1$ at an injection rate $Q_2$ satisfying $$0.3 < \alpha\left(\frac{A\phi x_2}{2Q_2}\right)^n < 0.85; \text{ and}$$

finally, performing water flooding.

According to the present disclosure, preferably, in step (6), when the water-cut reaches a level before the current round of encapsulated polymer flooding is performed, an encapsulated polymer and an injection scheme for the flooding field are redesigned according to steps (1) to (5).

An encapsulated polymer flooding system for enhancing oil recovery includes:

a target oil reservoir parameter, well deployment, and development dynamic state determination module, configured to determine reservoir parameters, a well deployment, and a development dynamic state of a target oil reservoir;

a near-wellbore targeted profile control area and far-wellbore targeted viscosification area determination module, configured to determine a near-wellbore targeted profile control area and a far-wellbore targeted viscosification area;

an encapsulated polymer design module, configured to design and synthesize an encapsulated polymer according to the conditions of the target oil reservoir;

an encapsulated polymer performance evaluation module, configured to evaluate the anti-shearing performance, the sustained release and viscosification performance, the injection performance, and the profile control performance of the encapsulated polymer based on laboratory tests; and an encapsulated polymer flooding field injection scheme formulation module, configured to formulate an injection scheme for an encapsulated polymer flooding field.

The present disclosure has the following beneficial effects:

The polymer is wrapped with the shell layer, which greatly reduces the shear degradation during injection of the polymer and effectively reduces the cost. The flow of the encapsulated polymer is a discontinuous phase seepage flow before the rupture is triggered, which can play a role in near-wellbore profile control and inhibit the invalid circulation of the injected fluid. The encapsulated polymer can be released in a targeted area deep in the oil reservoir to recover the target remaining oil and greatly enhance oil recovery.

BRIEF DESCRIPTION OF THE DRAWINGS

In order to more clearly describe the technical solutions of the embodiments of the present disclosure, the following will briefly introduce the drawings that need to be used in the embodiments of the present disclosure. Obviously, the drawings described below are only some embodiments of the present disclosure. Those of ordinary skill in the art may obtain other drawings based on these drawings without involving any inventive effort.

DETAILED DESCRIPTION OF THE EMBODIMENTS

In order to make the objective, technical solutions, and advantages of the present disclosure clearer, the present disclosure will be described in further detail below with reference to the drawings and embodiments of the description, and variables in calculation formulas involved in the solutions all adopt the International System of Units unless otherwise specified. All other embodiments obtained by those of ordinary skill in the art based on the embodiments of the present disclosure without involving any inventive effort shall fall within the scope of protection of the present disclosure.

Embodiment 1

Figure 1:
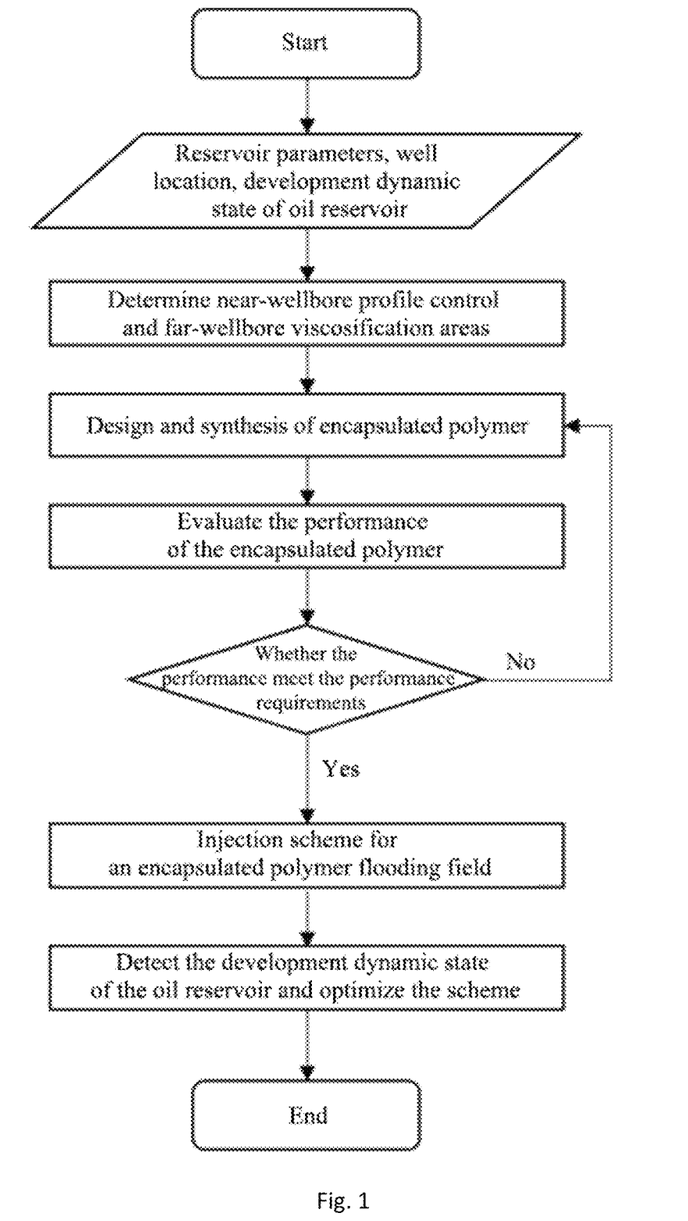
FIG. 1 is a flow block diagram of an encapsulated polymer flooding method for enhancing oil recovery of the present disclosure.

As shown in FIG. 1, an encapsulated polymer flooding method for enhancing oil recovery includes:

(1) Determination of reservoir parameters, a well deployment, and a development dynamic state of a target oil reservoir Reservoir permeability, porosity, heterogeneity, temperature, salinity, positions of and a relative distance between a water injection well and a producing well, and a remaining oil distribution are determined by comprehensively utilizing well test interpretation data, water-cut monitoring data, numerical reservoir simulation, and other means.

A certain water injection well and a certain producing well in a certain oilfield block are taken as an example, by comprehensively utilizing well test interpretation data, water-cut monitoring data, numerical reservoir simulation, and other means, it is determined that the average permeability of a reservoir is 48.8 mD, the average porosity is 15.2%, the formation temperature is 75° C., the salinity is 12,000 mg/L, the viscosity of underground crude oil is 39 mPa·s, a distance between the water injection well and the corresponding producing well is 150 m, the cross-sectional area of the reservoir in a seepage direction is about 50 m², the water-cut of a production fluid of an oil well developed by water flooding is 95.2% up to now, the heterogeneity of the reservoir in the seepage direction and a remaining oil distribution may be specifically determined according to the well test data, an average permeability ratio is 5, an average permeability variation coefficient is 0.5, and the average remaining oil saturation is 0.8.

(2) Determination of a near-wellbore targeted profile control area, and a far-wellbore targeted viscosification area A near-wellbore zone has serious reservoir heterogeneity due to water injection scouring. An area with the maximum intra-reservoir longitudinal permeability ratio in the seepage direction or a longitudinal permeability variation coefficient greater than 0.6 is determined as a near-well targeted profile control area of the reservoir, and the maximum horizontal distance between the near-wellbore targeted profile control area of the reservoir and the water injection well is defined as a targeted distance $x_1$, which is 10 m. A large amount of remaining oil remains underground in a far-wellbore zone due to a dominant channel of water injection. An area with the intra-reservoir longitudinal average remaining oil saturation greater than 0.6 is defined as a far-wellbore targeted viscosification area, and the minimum horizontal distance between the far-wellbore targeted viscosification area and the water injection well is defined as a targeted distance $x_2$, which is 50 m.

Figure 2:
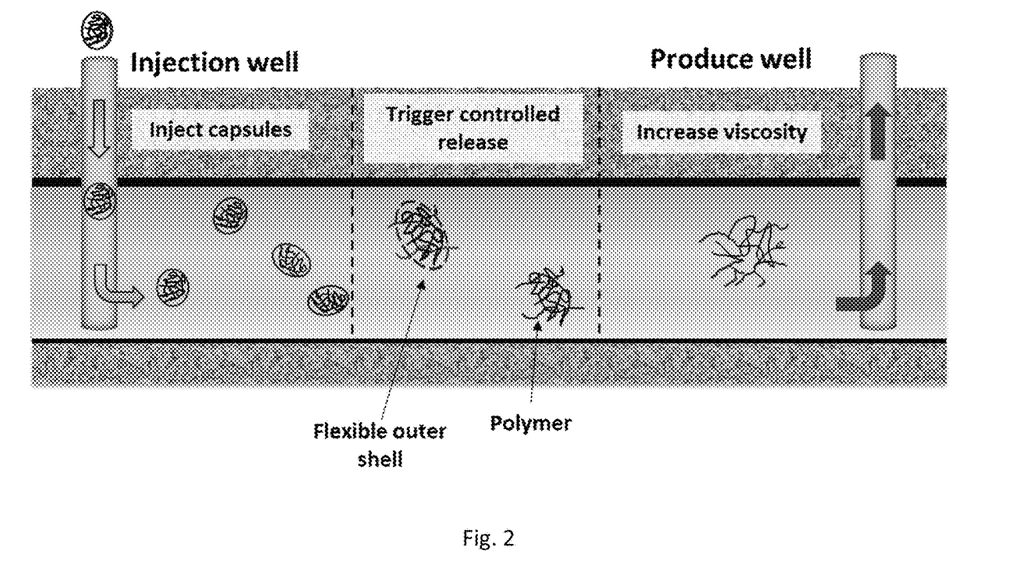
FIG. 2 is a schematic diagram of a seepage process of an encapsulated polymer of the present disclosure.

(3) Design and synthesis of an encapsulated polymer according to conditions of the target oil reservoir An encapsulated polymer refers to a microencapsulated polymer formed by wrapping a polymer with a shell layer by a chemical encapsulation method that specifically refers to the method provided by Gong, et al. (Gong J, Wang Y, Cao X, et al. Journal of Molecular Liquids, 2022: 119394) or Liao, et al. (Liao Z, Xue D, Li H, et al. Journal of Applied Polymer Science, 2016, 133 (36): 43905). The encapsulated polymer has a particle size of 100 nm to 10 μm and a rupture trigger mechanism under conditions of the reservoir. An outer shell of the encapsulated polymer is elastic and has particle flow characteristics before rupture. The polymer is released after the rupture of the encapsulated polymer is triggered, and the viscosity of a fluid injected into the formation is increased. With regard to the conditions of the reservoir, a temperature-controlled dissolution mechanism is taken as a trigger mechanism of the capsule, a seepage process of the capsule in the formation is shown in FIG. 2.

A particle size and an elastic modulus of the encapsulated polymer are customized according to near-wellbore permeability conditions.

The particle size is customized according to the near-wellbore permeability conditions:

$$d = a\tau\sqrt{\frac{8k}{\phi}} = 0.8 \times 1.5 \times \sqrt{\frac{8 \times 48.8 \times 10^{-15}}{0.152}} = 1.92 \times 10^{-6} \text{m}$$

in formula (I), d is the particle size of the encapsulated polymer, a is a coefficient with a value range of 0.1-5, $\tau$ is tortuosity of the near-wellbore targeted profile control area, k is average permeability of the near-wellbore targeted profile control area, and $\phi$ is porosity of the near-wellbore targeted profile control area.

The elastic modulus of the outer shell of the capsule is determined:

$$E_0 = \sigma_0 \sqrt{\frac{\phi}{8000\tau^2 k}} = 1 \times 10^{-3} \times \sqrt{\frac{0.152}{8000 \times 1.5^2 \times 48.8 \times 10^{-15}}} = 13.15 \text{ Pa},$$

$$E = (0.1 + bk_{mn}) \times E_0(0.1 + 0.02 \times 5) = 2.63 \text{ Pa},$$

where, E is the elastic modulus of the outer shell of the capsule, b is a coefficient with a value range of 0.01-5, the higher the permeability is, the greater the value is, $k_{mn}$ is an intra-reservoir permeability ratio, and $\sigma_0$ is reference interfacial tension, which is 1 mN/m.

Figure 3:
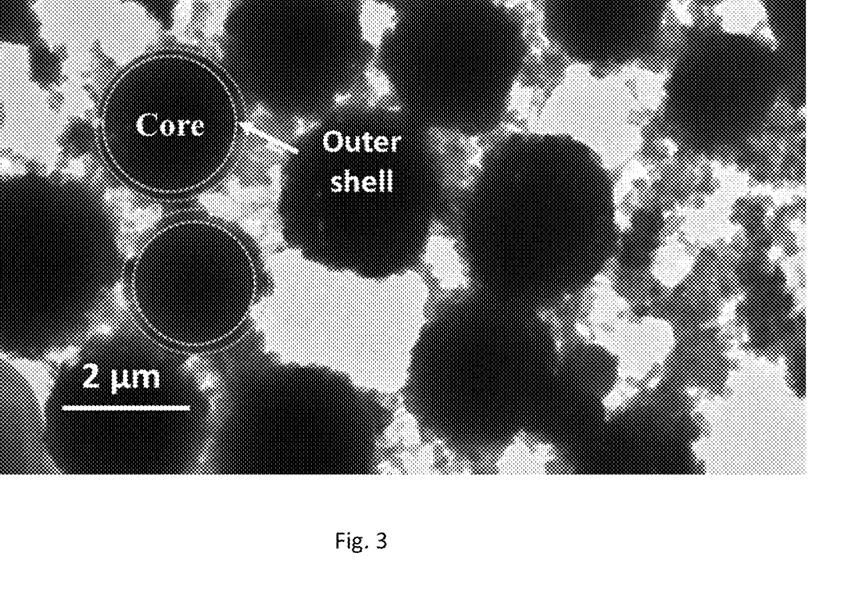
FIG. 3 is a schematic diagram of a transmission electron microscope image of a capsule of the present disclosure.

A microgram of the finally synthesized encapsulated polymer is shown in FIG. 3.

A trigger mechanism of the encapsulated polymer is customized according to the targeted distances and the conditions of the reservoir, and the trigger mechanism of the encapsulated polymer includes an electrostatic shielding mechanism of salinity, a water percolation and swelling mechanism, and a temperature dissolution mechanism.

In step (3), the operation of customizing a trigger mechanism of the encapsulated polymer according to the targeted distances and the conditions of the reservoir includes: first, temperature and salinity under formation conditions are determined; and whether temperature dissolution or electrostatic shielding of salinity is selected as a main factor for destroying the shell layer of the capsule according to the temperature and salinity. Which one is the main factor mainly depends on the difficulty of the synthesis process and the requirements of the targeted distances, and can be flexibly selected. The targeted distance is a distance between the injection well and the targeted area, and the capsule needs to be not broken before arriving at the targeted region and to be broken after arriving at the targeted area.

(4) Whether the anti-shearing performance, the sustained release and viscosification performance, the injection performance, and the profile control performance of the encapsulated polymer meet expected performance requirements are evaluated and determined based on laboratory tests; and step (3) is performed to redesign an encapsulated polymer if no.

An anti-shearing test is performed on capsules at different mass concentrations, and the encapsulated polymer is not broken at ground temperature and a shear rate of 1000 s$^{-1}$, so it meets the performance requirements.

Polymer capsules at different mass concentrations are selected for test, and at formation temperature, when the concentration of the encapsulated polymer is greater than 1,200 mg/L, the maximum viscosity of the encapsulated polymer after complete release is greater than 20 mPa·s. Therefore, the injection concentration shall not be less than 1,200 mg/L.

Figure 4:
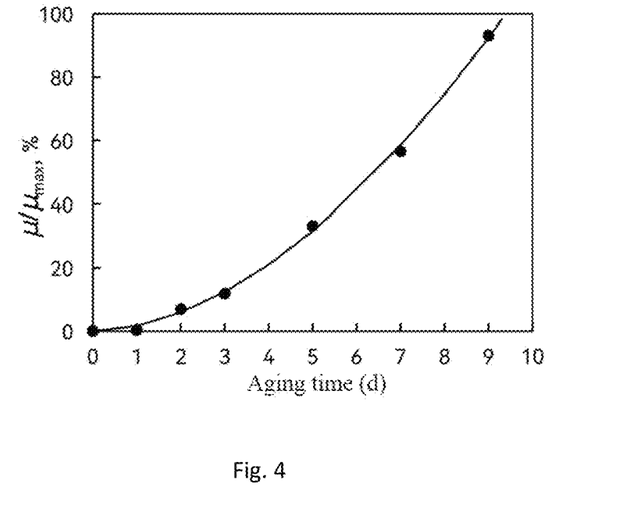
FIG. 4 is a schematic diagram of a viscosity release rate of an encapsulated polymer of the present disclosure.

A laboratory aging test is performed on capsules at different mass concentrations to determine a release rate and viscosification performance, that is, the sustained release and viscosification performance, of the polymer in the formation. At formation temperature (75° C.), a viscosity release rate of the polymer is shown in FIG. 4. A relationship between the viscosity of the polymer and time satisfies $\mu = 1.73^{-9} t^{1.82} \mu_{max}$, $\mu$ is the viscosity, $\mu_{max}$ is the maximum viscosity of the polymer capsule after complete release, and t is time. The encapsulated polymer is a tackifier, after the capsule is broken, the viscosity of a fluid is increased, that is, the viscosity is released slowly. Referring to sustained release pharmaceutical capsule, it is generally required to release after the polymer capsule arrives at the targeted area.

Figure 5:
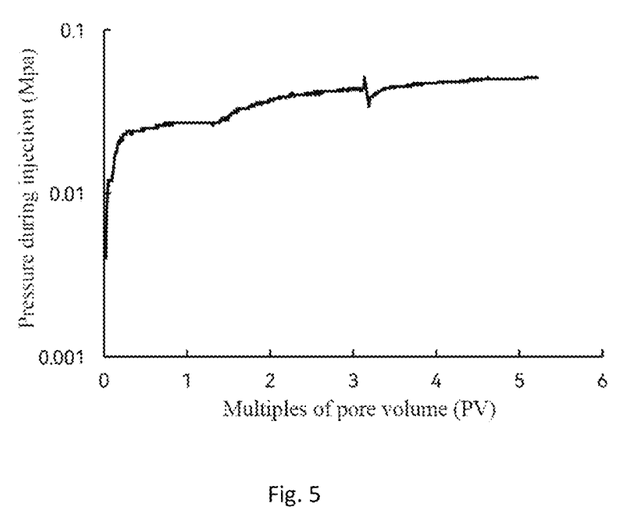
FIG. 5 is a schematic diagram of evaluation results of an injection capacity test of an encapsulated polymer of the present disclosure.

A single core encapsulated polymer injection test is performed, and a pressure change during injection, that is, the injection performance, is recorded. Pressure during injection of the encapsulated polymer under the permeability of the reservoir is shown in FIG. 5. The pressure of injection of the encapsulated polymer is 2.5 times of pressure of injection of water, which meets the performance requirements.

Figure 6:
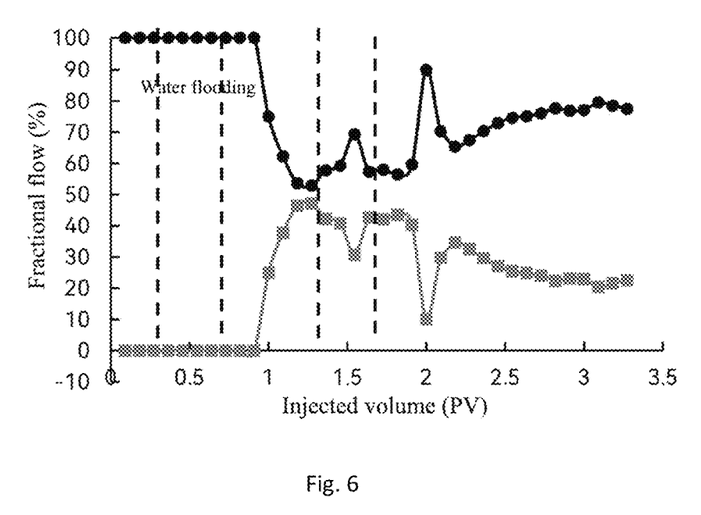
FIG. 6 is a schematic diagram of evaluation results of a profile control capacity test of an encapsulated polymer of the present disclosure.

A double-pipe permeability ratio seepage test is performed, and a cross-section improvement coefficient is recorded to evaluate the profile control performance, and the optimal profile control concentration is denoted as $c_1$. At the near-wellbore permeability ratio, polymer capsules with injection concentrations of 1,500 mg/L, 2,000 mg/L, 2,500 mg/L, and 3,000 mg/L are selected for a fractional flow evaluation test, and a variation trend of fractional flow in different phases of the test are shown in FIG. 6. A profile improvement effect of the polymer capsule at the concentration of 3,000 mg/L is the best, and in this case, a profile improvement coefficient is 50.57%, which is greater than 50%, and meets the performance requirements. A formula for calculating the profile improvement coefficient is as follows:

$$f = \frac{\left(0.5 - \frac{Q_{lb}}{Q_{lb} + Q_{hb}}\right) - \left(0.5 - \frac{Q_{la}}{Q_{la} + Q_{ha}}\right)}{0.5 - \frac{Q_{lb}}{Q_{lb} + Q_{hb}}} \times 100\%$$

where, $Q_{la}$ and $Q_{lb}$ respectively represent cumulative total flows in a low-permeability pipe water flooding phase and a subsequent water flooding phase, and $Q_{ha}$ and $Q_{hb}$ respectively represent cumulative total flows in high-permeability pipe water flooding phase and a subsequent water flooding phase.

It is to be pointed out that if any performance does not meet the requirements during the tests, it is necessary to perform step (3) and change coefficients a and b to redesign and synthesize an encapsulated polymer.

(5) An injection scheme is formulated for an encapsulated polymer flooding field.

First, an encapsulated polymer 0.1PV at a concentration of 3,000 mg/L is injected at an injection rate of 200 m³/d, and $$\alpha\left(\frac{A\phi x_1}{2Q_1}\right)^n = 1.73^{-9}\left(\frac{50 \times 0.152 \times 10}{2 \times 200/86400}\right)^{1.82} = 0.0813 < 0.3,$$

which meets the injection rate requirements, where, A is the cross-sectional area of the formation, and $\phi$ is the porosity of the near-wellbore targeted profile control area.

Then, an encapsulated polymer 0.4PV at a concentration of 1,800 mg/L at an injection rate of 300 m³/d, and $$\alpha\left(\frac{A\phi x_1}{2Q_1}\right)^n = 1.73^{-9}\left(\frac{50 \times 0.152 \times 50}{2 \times 300/86400}\right)^{1.82} = 0.73,$$

which is between 0.3 and 0.85 and meets the injection rate requirements.

Finally, subsequent water flooding is performed until the water-cut reaches a level before the current round of encapsulated polymer flooding is performed.

(6) The development dynamic state of the oil reservoir is monitored, and the properties of the encapsulated polymer and the injection scheme for the flooding field are iteratively regularly optimized according to steps (1) to (5).

After being injected, the encapsulated polymer can longitudinally control the profile in the near-wellbore zone, and can increase the viscosity to expand the planar sweep in the far-wellbore zone, thereby enhancing oil recovery. The design of the injection scheme is to allow the encapsulated polymer to work efficiently.

After encapsulated polymer flooding is performed, the water-cut is decreased from 95.2% to 78.5%, and then gradually increased to more than 95%, and at this moment, dynamic parameters of the oil reservoir are updated, and an encapsulated polymer and an injection scheme are redesigned according to steps (1) to (5).

Embodiment 2

An encapsulated polymer flooding system for enhancing oil recovery includes:
a target oil reservoir parameter, well deployment and development dynamic state determination module, configured to determine reservoir parameters, a well deployment, and a development dynamic state of a target oil reservoir;
a near-wellbore targeted profile control area and far-wellbore targeted viscosification area determination module, configured to determine a near-wellbore targeted profile control area and a far-wellbore targeted viscosification area;
an encapsulated polymer design module, configured to design and synthesize an encapsulated polymer according to conditions of the target oil reservoir;
an encapsulated polymer performance evaluation module, configured to evaluate the anti-shearing performance, the sustained release and viscosification performance, the injection performance, and the profile control performance of the encapsulated polymer based on laboratory tests; and
an encapsulated polymer flooding field injection scheme formulation module, configured to formulate an injection scheme for an encapsulated polymer flooding field.

What is claimed is:

1. An encapsulated polymer flooding method for enhancing oil recovery, comprising:
(i) determination of reservoir parameters, a well deployment, and a development dynamic state of a target oil reservoir:
determining reservoir permeability, porosity, heterogeneity, temperature, salinity, positions of and a relative distance between a water injection well and a producing well, and a remaining oil distribution;
(ii) determination of a near-wellbore targeted profile control area and a far-wellbore targeted viscosification area:
determining an area with the maximum intra-reservoir longitudinal permeability ratio or a longitudinal permeability variation coefficient greater than 0.6 in a seepage direction as a near-wellbore targeted profile control area of the oil reservoir, defining the maximum horizontal distance between the near-wellbore targeted profile control area of the oil reservoir and the water injection well as a targeted distance $x_1$, determining an area with the intra-reservoir longitudinal average remaining oil saturation greater than 0.6 as a far-wellbore targeted viscosification area, and defining the minimum horizontal distance between the far-wellbore targeted viscosification area and the water injection well as a targeted distance $x_2$;
(iii) design and synthesis of an encapsulated polymer according to conditions of the target oil reservoir:
an encapsulated polymer referring to a microencapsulated polymer formed by wrapping a polymer with a shell layer by a chemical encapsulation method,
customizing a particle size and an elastic modulus of the encapsulated polymer according to near-wellbore permeability conditions; and
customizing a trigger mechanism of the encapsulated polymer according to the targeted distances and the conditions of the reservoir, the trigger mechanism of the encapsulated polymer comprising an electrostatic shielding mechanism of salinity, a water percolation and swelling mechanism, and a temperature dissolution mechanism;
(iv) evaluating and determining whether the anti-shearing performance, the sustained release and viscosification performance, the injection performance, and the profile control performance of the encapsulated polymer meet expected performance requirements based on laboratory tests; and performing step (iii) to redesign an encapsulated polymer if no;
(v) formulating an injection scheme for an encapsulated polymer flooding field; and
(vi) monitoring the development dynamic state of the oil reservoir, and iteratively regularly optimizing the properties of the encapsulated polymer and the injection scheme for the flooding field according to steps (i) to (v).

2. The encapsulated polymer flooding method for enhancing oil recovery according to claim 1, wherein a criterion for determining the particle size is represented by formula (I):

$$d = a\tau\sqrt{\frac{8k}{\phi}} \qquad (I)$$

wherein, d is the particle size of the encapsulated polymer, a is a coefficient with a value range of 0.1-5, $\tau$ is tortuosity of the near-wellbore targeted profile control area, k is average permeability of the near-wellbore targeted profile control area, and $\phi$ is porosity of the near-wellbore targeted profile control area.

3. The encapsulated polymer flooding method for enhancing oil recovery according to claim 1, wherein a criterion for determining the elastic modulus is represented by formula (II):

$$E=(0.1+bk_{mn})E_0 \quad (II)$$

wherein, E is the elastic modulus of the outer shell of the capsule, b is a coefficient with a value range of 0.01-5, $k_{mn}$ is an intra-reservoir permeability ratio, $E_0$ is a reference elastic modulus taking $$E_0 = \sigma_0 \sqrt{\frac{\phi}{8000\tau^2 k}}, \text{ and}$$

$\sigma_0$ is reference interfacial tension.

4. The encapsulated polymer flooding method for enhancing oil recovery according to claim 1, wherein in the step (iv), an anti-shearing test is performed on capsules at different mass concentrations to determine a critical shear rate at which the capsule is broken at ground temperature, that is, the anti-shearing performance of the encapsulated polymer;

a laboratory aging test is performed to determine a release rate and the viscosification performance of the polymer in the formation, that is, the sustained release and viscosification performance, a relationship between the viscosity of the polymer and time satisfies $\mu=\alpha t^n \mu_{max}$, $\mu$ is the viscosity, $\mu_{max}$ is the maximum viscosity of the polymer capsule after complete release, t is time, and $\alpha$ and n are coefficients;

a single core encapsulated polymer injection test is performed, and a pressure change during injection, that is, the injection performance, is recorded, a double-pipe permeability ratio seepage test is performed, a profile improvement coefficient is recorded to evaluate the profile control performance, and the optimal profile control concentration is denoted as $c_1$; and the expected performance requirements are: the critical shear rate of the encapsulated polymer is not less than 600 s$^{-1}$, the maximum viscosity of the polymer capsule after complete release is not less than 20 mPa·s, pressure during injection of the encapsulated polymer is less than 5 times of pressure during injection of water, and the profile improvement coefficient is greater than 50%.

5. The encapsulated polymer flooding method for enhancing oil recovery according to claim 1, wherein in the step (v), the injection scheme for the encapsulated polymer flooding field comprises:

first, injecting an encapsulated polymer 0.1PV at a concentration of $c_1$ at an injection rate $Q_1$ satisfying $$\alpha\left(\frac{A\phi x_1}{2Q_1}\right)^n < 0.3,$$

A being the cross-sectional area of the formation, and $\phi$ being the porosity of the near-wellbore targeted profile control area;

then, injecting an encapsulated polymer 0.4PV at a concentration of $0.5c_1$ at an injection rate $Q_2$ satisfying $$0.3 < \alpha\left(\frac{A\phi x_2}{2Q_2}\right)^n < 0.85; \text{ and}$$

finally, performing water flooding.

6. The encapsulated polymer flooding method for enhancing oil recovery according to claim 1, wherein in the step (vi), when the water-cut reaches a level before the current round of encapsulated polymer flooding is performed, an encapsulated polymer and an injection scheme for the flooding field are redesigned according to the steps (i)-(v).

7. An encapsulated polymer flooding system for enhancing oil recovery, comprising:

a target oil reservoir parameter, well deployment and development dynamic state determination module, configured to determine reservoir parameters, a well deployment, and a development dynamic state of the target oil reservoir by determining reservoir permeability, porosity, heterogeneity, temperature, salinity, positions of and a relative distance between a water injection well and a producing well, and a remaining oil distribution;

a near-wellbore targeted profile control area and far-wellbore targeted viscosification area determination module, configured to determine the near-wellbore targeted profile control area and the far-wellbore targeted viscosification area by determining an area with the maximum intra-reservoir longitudinal permeability ratio or a longitudinal permeability variation coefficient greater than 0.6 in a seepage direction as a near-wellbore targeted profile control area of the oil reservoir, defining the maximum horizontal distance between the near-wellbore targeted profile control area of the oil reservoir and the water injection well as a targeted distance $x_1$, determining an area with the intra-reservoir longitudinal average remaining oil saturation greater than 0.6 as a far-wellbore targeted viscosification area, and defining the minimum horizontal distance between the far-wellbore targeted viscosification area and the water injection well as a targeted distance $x_2$;

an encapsulated polymer design module, configured to design and synthesize an encapsulated polymer according to conditions of the target oil reservoir;

an encapsulated polymer performance evaluation module, configured to evaluate the anti-shearing performance, the sustained release and viscosification performance, the injection performance, and the profile control performance of the encapsulated polymer based on laboratory tests; and an encapsulated polymer flooding field injection scheme formulation module, configured to formulate an injection scheme for an encapsulated polymer flooding field.

* * * * *